United States Patent [19]

Sarin et al.

[11] 4,441,894

[45] Apr. 10, 1984

[54] COATED COMPOSITE SILICON NITRIDE CUTTING TOOLS

[75] Inventors: Vinod K. Sarin, Lexington; Sergej-Tomislav Buljan, Acton, both of Mass.

[73] Assignee: GTE Laboratories Incorporated, Waltham, Mass.

[21] Appl. No.: 536,110

[22] Filed: Sep. 26, 1983

[51] Int. Cl.$^3$ .............................................. B24D 11/00
[52] U.S. Cl. ........................................ 51/295; 51/293; 51/307; 51/309; 427/249; 428/698
[58] Field of Search ................. 51/293, 295, 307, 309; 427/215, 249, 255; 428/698, 404

[56] References Cited

U.S. PATENT DOCUMENTS

| | | | |
|---|---|---|---|
| 3,684,585 | 8/1972 | Stroup et al. | 427/249 |
| 3,895,923 | 7/1975 | Wakefield | 428/698 |
| 4,179,301 | 12/1979 | Buljan | 501/154 |
| 4,406,667 | 9/1983 | Sarin et al. | 51/295 |
| 4,409,004 | 10/1983 | Sarin et al. | 51/295 |

*Primary Examiner*—Donald E. Czaja
*Assistant Examiner*—W. Thompson
*Attorney, Agent, or Firm*—Ivan L. Ericson

[57] ABSTRACT

Cutting tools and cutting tool inserts having improved mechanical and chemical wear resistance under demanding conditions of machining speed, temperature, or workpiece hardness comprise a composite silicon nitride substrate having at least one intermediate hard adherent coating layer of a refractory material and an outer adherent coating layer. The intermediate adherent coating layer has a different chemical composition than the outer adherent coating layer. The composite silicon nitride substrate body consists essentially of particles of a refractory material uniformly distributed in a matrix consisting essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof.

9 Claims, No Drawings

COATED COMPOSITE SILICON NITRIDE CUTTING TOOLS

CROSS-REFERENCE TO RELATED APPLICATIONS

This application contains subject matter related to matter disclosed and claimed in copending patent application Ser. No. 128,070 filed Mar. 7, 1980, now abandoned entitled "Abrasion Resistant Silicon Nitride Based Articles" and in the following copending applications filed concurrently herewith, all assigned to the assignee of the present application:

Application Ser. No. 380,364 now U.S. Pat. No. 4,425,141 entitled "Composite Ceramic Cutting Tool";

Application Ser. No. 380,361 now U.S. Pat. No. 4,421,528 entitled "Process for Making a Modified Silicon Aluminum Oxynitride Based Composite Cutting Tool";

Application Ser. No. 380,384 now U.S. Pat. No. 4,431,431 entitled "Carbide Coated Silicon Nitride Cutting Tools";

Application Ser. No. 380,363 entitled "Alumina Coated Silicon Nitride Cutting Tools";

Application Ser. No. 380,381 now U.S. Pat. No. 4,409,003 entitled "Carbonitride Coated Silicon Nitride Cutting Tools";

Application Ser. No. 380,383 now U.S. Pat. No. 4,406,668 entitled "Nitride Coated Silicon Nitride Cutting Tools";

Application Ser. No. 380,362 now U.S. Pat. No. 4,416,670 entitled "Carbide Coated Composite Silicon Nitride Cutting Tools";

Application Ser. No. 380,379 now U.S. Pat. No. 4,421,525 entitled "Alumina Coated Composite Silicon Nitride Cutting Tools";

Application Ser. No. 380,382 now U.S. Pat. No. 4,409,004 entitled "Carbonitride Coated Composite Silicon Nitride Cutting Tools";

Application Ser. No. 380,380 now U.S. Pat. No. 4,406,667 entitled "Nitride Coated Composite Silicon Nitride Cutting Tools";

Application Ser. No. 380,387 now U.S. Pat. No. 4,426,209 entitled "Carbide Coated Composite Modified Silicon Aluminum Oxynitride Cutting Tools";

Application Ser. No. 380,388 now U.S. Pat. No. 4,424,066 entitled "Alumina Coated Composite Modified Silicon Aluminum Oxynitride Cutting Tools";

Application Ser. No. 380,389 now U.S. Pat. No. 4,406,669 entitled "Carbonitride Coated Composite Modified Silicon Aluminum Oxynitride Cutting Tools";

Application Ser. No. 380,452 now U.S. Pat. No. 4,406,670 entitled "Nitride Coated Composite Modified Silicon Aluminum Oxynitride Cutting Tools";

Application Ser. No. 536,111, entitled "Carbide Coated Composite Modified Silicon Aluminum Oxynitride Cutting Tools";

Application Ser. No. 536,109, entitled "Carbide Coated Silicon Nitride Cutting Tools".

FIELD OF THE INVENTION

This invention relates to cutting tools and cutting tool inserts. More particularly, it is concerned with composite silicon nitride ceramic cutting tools and tool inserts having refractory materials.

BACKGROUND OF THE INVENTION

Cemented carbide materials are well known for their unique combination of properties of hardness, strength, and wear resistance and have accordingly found extensive use in mining tool bits, metal cutting and boring tools, metal drawing dies, wear resistant machine parts and the like. It is known that the wear resistance of cemented carbide materials may be enhanced by the application of thin coatings of a highly wear resistant material such as titanium carbide or aluminum oxide. These coated carbide materials are finding increasing commercial utility for certain cutting tool and machining applications.

Economic pressures for higher productivity in machining applications are placing increasing demands upon the performance of cutting tool materials. To achieve high productivity in machining, a tool must be able to cut at high speeds. At cutting speeds exceeding 1500 surface feet per minute (sfpm), the high temperature strength and chemical inertness of a cutting tool material become more and more important. The usefulness of cemented carbide cutting tool materials (the predominant material used in cutting tools today) has been extended to applications requiring cutting speeds of about 1500 sfpm by coating such tools with aluminum oxide. For cutting speeds in excess of 1500 sfpm, cemented carbide tools encounter problems associated with loss of strength and tool nose deformation, which affect dimensional tolerance in the workpiece and contribute to shorter tool life.

Conventional ceramic cutting tools overcome many of these disadvantages but have some limitations relating to their lower impact strength and fracture toughness. This is especially true of many alumina-based conventional ceramic cutting tools. Silicon nitride-based ceramic cutting tools have significantly higher impact strength and fracture toughness, but can exhibit lower than desired chemical inertness when employed in cutting long-chipping metals such as steel.

OBJECTS OF THE INVENTION

It is therefore an object of the present invention to provide improved cutting tools and cutting tool inserts.

It is another object of this invention to provide improved cutting tool inserts useful in the machining of metals under demanding conditions of machining speed, temperature, or workpiece hardness.

It is another object of the present invention to provide an improved wear resistant composite ceramic cutting tool with improved performance in cutting long-chipping workpiece materials.

SUMMARY OF THE INVENTION

These and other objects, advantages and capabilities are achieved in accordance with the present invention wherein a coated cutting tool or cutting tool insert comprises a composite silicon nitride substrate body having at least one intermediate adherent coating of a material selected from a refractory material and an outer adherent coating layer of a refractory material. The intermediate adherent coating layer has a different chemical composition than the outer adherent coating layer. More particularly, the substrate consists essentially of particles of a refractory material uniformly distributed in a matrix. The matrix consists essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof. The intermediate adherent coating layer and the outer adherent coating layer are selected from the group consisting of carbides, nitrides, carbonitrides of Ti, V, Cr, Zr, Nb, Mo, Hf, Ta, W and combinations thereof and alumina.

DETAILED DESCRIPTION

Coated cutting tools and tool inserts according to the present invention comprise a composite silicon nitride substrate comprising finely divided particles of a hard refractory material uniformly distributed in a densified silicon nitride matrix. By the term hard refractory material, as used throughout this specification and the appended claims, is meant any carbide and/or nitride and/or carbonitride of a refractory metal, including mixtures and solid solutions thereof. Particular hard refractory materials contemplated as falling within the scope of this invention are materials selected from the foregoing which have a microhardness greater than about 1000 kg/mm$^2$ and a fusion or decomposition temperature greater than about 1500° C. Typical hard refractory materials are the carbides and/or nitrides and/or carbonitrides of titanium, vanadium, chromium, zirconium, niobium, molybdenum, hafnium, tantalum and tungsten, including combinations and solid solutions thereof. The most preferred hard refractory particulates are titanium carbide, titanium nitride, titanium carbonitride, hafnium carbide and hafnium nitride. The particles of the hard refractory material are uniformly distributed in a matrix consisting essentially of a first phase of silicon nitride and a refractory second phase comprising silicon nitride and an effective amount of a densification aid selected from the group consisting of yttrium oxide, zirconium oxide, hafnium oxide, the lanthanide rare earth oxides, and mixtures thereof.

The average particle size of the hard refractory particulate preferably ranges between about 0.5 micron to about 20 microns, more preferably from about 0.5 microns to about 5 microns.

The useful life and performance of cutting tools and tool inserts in accordance with this invention depend to a large measure on the volume fraction taken up by the particulate hard refractory material of the total composite. It has been found that the hardness of the cutting tool substrate body generally increases with increasing volume percent content of the particulate hard refractory material up to about 60 volume percent, but in order to obtain highest hardness and fracture toughness, it is preferred that the carbide and/or nitride and/or carbonitride particulate contained in the substrate body ranges between about 15 to about 50 volume percent, most preferably from about 20 to about 40 volume percent.

The substrate body of coated composite silicon nitride cutting tools and tool inserts in accordance with this invention possesses a composite microstructure in which the hard refractory particulate is distributed throughout a host matrix. The matrix consists essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof.

Because the intergranular phase is essentially continuous, and because impurities and additives present in the overall composite substrate body tend to concentrate in the intergranular phase during the densifying process, the composition of the intergranular phase profoundly affects the high temperature properties of the densified composite.

It is considered important to incorporate into this intergranular phase of the host matrix a densification aid which permits densification to densities approaching theoretical, and at the same time does not deleteriously affect the high temperature strength and creep resistance of the overall composite. Typical densification aids useful for this purpose are metal oxides selected from magnesium oxide, yttrium oxide, zirconium oxide, hafnium oxide, the lanthanide rare earth oxides, and mixtures thereof. Yttrium oxide and hafnium oxide are preferred. The metal oxide densification aid is employed in amounts from a lower effective amount which permits full densification to an upper amount which does not unduly affect the high temperature properties of the body. Preferably the metal oxide densification aid comprises from about 1 weight percent to about 25 weight percent of the two phase host matrix in which the hard refractory particulate is dispersed. More preferably, the metal oxide comprises from about 1 weight percent to about 5 weight percent of the host matrix.

Silicon dioxide is added to the initial powder mixture employed in the formation of the substrate body or alternatively, is present as a surface oxide coating on the silicon nitride employed. During subsequent processing of the powder mixture to form the densified composite silicon nitride substrate body, the silicon dioxide and metal oxide densification aid tend to concentrate in the intergranular phase. It is preferred that the amount of silicon dioxide present in the final densified body comprise less than about 5 weight percent of the host matrix.

The intergranular phase of the substrate host matrix may contain further additional materials in the form of additives or impurities in addition to the above-mentioned silicon dioxide and metal oxide densification aids. Such further additional materials are preferably present in amounts less than about 5 weight percent of the host matrix.

In accordance with the principles of the present invention, the substrate body or the intermediate adherent coating layers are coated with at least one hard adherent coating layer comprising a refractory material. Typical refractory material for the adherent coating layers includes; nitrides, carbides and carbonitrides of titanium, vanadium, chromium, zirconium, niobium, molybdenum, hafnium, tantalum, and tungsten, and alumina. Preferred coatings in accordance with this invention are titanium nitride, titanium carbide, titanium carbonitride and hafnium nitride, hafnium carbide and hafnium carbonitride; and alumina.

The intermediate and outer coating layers are of a thickness ranging between about 0.1 microns to about 20 microns, preferably between about 1.0 and about 10 microns. Exemplary methods of making coated cutting tools and tool inserts in accordance with this invention are given below. The methods are to be viewed as illustrative and are not to be viewed as limiting the scope of the invention as defined by the appended claims. Methods I and II below illustrate methods of preparing the substrate body of cutting tools and tool inserts of this invention. In one method, pressed green compacts containing silicon nitride, a hard particulate refractory material, silicon dioxide, and one or more metal oxides serving as densification aids are sintered to a dense body. In the other method, dry powder mixtures of the above materials are hot pressed to produce a shaped cutting tool insert.

Method I

To one part by weight of a powder mixture of silicon nitride, a hard refractory material, and metal oxide densification aid are added about 2.5 parts by weight of toluene, 0.1 parts by weight of methanol, and about 0.05 parts by weight of stearic acid. The resulting slurry is thoroughly mixed by ball milling and then dried at 75° C. The resulting dry mixture is ball milled for about 24 hours and then mixed with about 0.05 parts by weight of a copolymer of polyethylene glycol and methoxypolyethylene glycol, 1 part by weight toluene, and about 0.05 parts by weight methanol. This mixture is mixed by ball milling for about 15 minutes, dried at 75° C. and then screened through a 60 mesh screen. The −60 mesh fraction is pressed at ambient temperatures at a pressure of about 25,000 psig to obtain a green compact. The residual solvents and stearic acid binder are removed from the green compact by heating at about 600° C. in an inert atmosphere. The green compact is then sintered to a hard, highly densified composite body by heating at a temperature of between about 1700° C. to about 1850° C.

Method II

The procedure of Method I is followed to the point of obtaining the −60 mesh dry powder mixture. This material is then pressed at a pressure of about 3000 psig and a temperature of about 1700° C. to produce a hard, highly densified composite body.

Coating Methods

The composite substrate body produced by either Method I or Method II or the intermediate adherent coating layer is coated with a refractory material by chemical vapor deposition techniques or physical vapor deposition techniques known in the art to form the adherent coating layer. For example, the preferred coatings of titanium or hafnium carbide, carbonitride or nitride and alumina are applied by chemical vapor deposition. Other metal carbides, carbonitrides or nitrides are applied by chemical vapor deposition techniques where such techniques are applicable, or by physical vapor deposition techniques such as direct evaporation, sputtering, etc.

Useful characteristics of the chemical vapor deposition method are the purity of the deposited layer and the tendency for some interaction between the layer being deposited and the substrate or intermediate layer during early stages of the deposition process which leads to good layer adherency.

As an example, titanium nitride layers are formed on the composite silicon nitride substrates or the intermediate layers of cutting tools of this invention by passing a gaseous mixture of titanium tetrachloride, a gaseous nitrogen source such as nitrogen or ammonia, and hydrogen over the substrate or intermediate layer at a temperature of between about 800° C. and 1500° C., preferably at temperatures above about 1000° C. The reaction is described by the following equation; hydrogen is added to insure that the reaction takes place in a reducing environment:

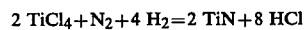

The mixture is passed over the heated substrate or intermediate layer until the desired coating thickness is achieved. Routine experimentation is used to determine the rate of coating thickness growth at a particular gaseous flow rate and temperature.

Another example, alumina intermediate or outer adherent coating layers are applied by chemical vapor deposition techniques or physical vapor deposition techniques known in the art. In one chemical vapor deposition technique, more fully described in U.S. Pat. No. 3,914,473, vaporized aluminum chloride or other halide of aluminum is passed over the heated substrate or over the intermediate coating together with water vapor and hydrogen gas. Alternatively, the aluminum oxide is deposited by physical vapor deposition techniques such as direct evaporation or sputtering. The reaction for the chemical vapor deposition technique is described by the following equation, although hydrogen gas is often added to insure that the reaction takes place in a reducing atmosphere:

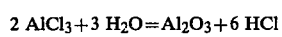

The substrate piece or pieces or previously coated substrate pieces are heated to a temperature between about 800° C. to about 1500° C. in a furnace equipped for gaseous flow. The aluminum chloride supply is pre-heated to vaporize the material, and the aluminum chloride vapor is passed through the furnace, together with the other gases. The gas mixture is passed over the heated substrate or coated substrates until the desired coating thickness is achieved. Routine experimentation is used to determine the rate of coating thickness growth at a particular gaseous flow rate and temperature.

In another, preferred method of coating the composite silicon nitride substrate bodies or coated bodies with an adherent alumina coating layer, is by reacting aluminum chloride is reacted with carbon dioxide in the presence of hydrogen gas according to the following equation:

carbon monoxide is optionally added to the gas mixture passed over the heated substrate bodies or coated bodies in order to establish the desired equilibrium gas composition. The following example illustrates the preparation of an intermediate alumina coating on a composite silicon nitride cutting tool inserts by this latter method.

A batch of 50 previously coated composite cutting tool inserts having the composition 54% $Si_3N_4$ and 6% $Y_2O_3$ containing 30 volume percent TiC were heated in a hydrogen gas atmosphere to a temperature of about 1200° C. At that temperature, a mixture of 70% $H_2$, 5% $CO_2$, 20% CO, and 5% $AlCl_3$ was introduced into the reaction chamber. The gas pressure was maintained at 50 Torr and a linear gas flow rate of 20 liters/minute was maintained. After 6 hours the coated tools were removed and the thickness of the alumina coating layer was determined to be about 2-3 microns by scanning electron microscope techniques.

Useful characteristics of the chemical vapor deposition method are the purity of the deposited layer and the tendency for some interaction between the layer being deposited and the substrate during early stages of the deposition process which leads to good layer adherency.

As an example, titanium nitride intermediate layers are formed on the composite silicon nitride substrates of cutting tools of this invention by passing a gaseous mixture of titanium tetrachloride, a gaseous nitrogen source such as nitrogen or ammonia, and hydrogen over the substrate at a temperature of between about 800° C. and 1500° C., preferably at temperatures above about 1000° C. The reaction is described by the following equation; hydrogen is added to insure that the reaction takes place in a reducing environment:

$$TiCl_4 + CH_4 = TiC + 4 HCl$$

The mixture is passed over the heated substrate until the desired coating thickness is achieved. Routine experimentation is used to determine the rate of coating thickness growth at a particular gaseous flow rate and temperature.

The following examples provide particulars for the preparation of coated composite silicon nitride substrate cutting tool inserts in accordance with the present invention having an intermediate coating of titanium carbide. In these examples, the composite substrate contain particulate titanium carbide uniformly distributed in the substrate matrix.

EXAMPLE 1

Titanium carbide-containing composite silicon nitride substrate bodies were coated with an intermediate coating of titanium carbide at atmospheric pressure. A gaseous mixture of 1% TiCl₄, 2% CH₄, and 97% H₂ was passed over the substrate bodies at a flow rate of about 20 liters/minute in a chamber held at a temperature of about 1100° C. for a period of about 2 hours. The resulting coated substrate bodies had a uniform adherent intermediate coating of titanium carbide approximately 6 microns in thickness. The coated substrate bodies are then coated with alumina as previously described.

EXAMPLE 2

Titanium carbide-containing composite silicon nitride substrate bodies were coated with an intermediate coating of titanium carbide at a pressure of about 50 Torr. A gaseous mixture of 1% TiCl₄, 1% CH₄, and 98% H₂ was passed over the substrate bodies at a flow rate of about 10 liters/minute in a chamber held at about 1100° C. for a period of about 6 hours. The resulting coated substrate bodies had a uniform adherent intermediate coating of titanium carbide approximately 6 microns in thickness. The coated substrate bodies are then coated with alumina as previously described.

As another example, the composite substrate body produced by either Method I or Method II is coated with an intermediate refractory metal carbonitride coating by chemical vapor deposition techniques or physical vapor deposition techniques known in the art. For example, the preferred coatings of titanium carbonitride or hafnium carbonitride are applied by chemical vapor deposition. Alternatively, the refractory metal is deposited by chemical or physical vapor deposition techniques after which the metal layer is nitrided and carburized.

As an example, titanium carbonitride intermediate layers are formed on the composite silicon nitride substrates of cutting tools of this invention in the chemical vapor deposition technique by passing a gaseous mixture of titanium tetrachloride, a gaseous carbon source such as methane, a gaseous nitrogen source such as nitrogen or ammonia, and hydrogen over the substrate at a temperature of between about 800° C. and 1500° C., preferably at temperatures above about 1200° C. Dissociated ammonia may be substituted for a mixture of nitrogen and hydrogen gases. The reaction is described by the following equation, although hydrogen is often added to insure that the reaction takes place in a reducing environment:

$$TiCl_4 + CH_4 + N_2 = Ti(C_xN_y) + 4HCl$$

The mixture is passed over the heated substrate until the desired coating thickness is achieved. Routine experimentation is used to determine the rate of coating thickness growth at a particular gaseous flow rate and temperature.

Control of the amounts of methane and nitrogen in the gas mixture permit the formation of layers in which the ratio of x to y in the formula $Ti(C_xN_y)$ are varied. The values of x and y preferably range between about 0.5 to about 0.6 for x and from about 0.4 to about 0.5 for y resulting in a preferred range of x/y ratio of from about 1.0 to about 1.5. The most preferred ratio of x to y is about 1.22, corresponding to values for x and y of about 0.55 and about 0.45, respectively.

The following examples provide details for the preparation of coated composite silicon nitride substrate cutting tool inserts having an intermediate coating of titanium carbonitride and an outer coating layer of alumina in accordance with the present invention. In these particular examples, the composite substrate contains particulate titanium carbide uniformly distributed in the substrate matrix.

EXAMPLE 3

Several composite silicon nitride substrate bodies containing about 30 volume percent titanium carbide were placed in a reactor and heated to a temperature of about 1060° C. A gaseous mixture of about 1% TiCl₄, 3.5% CH₄, 2.5% N₂, and 93% H₂ was passed over the bodies at atmospheric pressure and at a flow rate of about 20 liters/minute for a period of about 2 hours. At the end of this time, the titanium carbonitride coated bodies were removed from the reactor, and the coating thickness was determined to be about 8 microns by scanning electron microscopic techniques. An analysis of the composition of the coating indicated that it had a C/N ratio of about 1.1. The coated substrate bodies are then coated with alumina as previously described.

EXAMPLE 4

Several composite silicon nitride substrate bodies containing about 30 volume percent titanium carbide were coated under essentially the same conditions as in example 3, however at a pressure of about 50 Torr. The gaseous mixture composition was about 0.5% TiCl₄, 1.5% CH₄, 2% N₂, and 96% H₂. After 2 hours of coating at about 1060° C., the bodies had a coating of less than 10 microns thickness, having a C/N ratio of about 1.1. The coated substrate bodies are then coated with alumina as previously described.

Depending on the machining application and the work piece material, the combination of various coatings as described above can be tailored to enhance the overall tool performance. This is achieved through the combinations which lead to improved adherence of the coatings to substrate and the coatings to coatings, and achieved by the improved structure/property of the coatings such as hardness, fracture toughness, impact resistance, chemical inertness, etc.

While there have been shown and described what are at present believe to be the preferred embodiments of the invention, it will be obvious to one skilled in the art that various modifications may be made therein without departing from the scope of the invention as defined by the appended claims.

What is claimed is:

1. A coated composite ceramic cutting tool comprising a densified composite silicon nitride substrate having at least one intermediate adherent refractory coating layer and an outer adherent alumina coating layer;

said substrate body consisting essentially of particles of a hard refractory material uniformly distributed in a matrix consisting essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof.

2. A coated composite ceramic cutting tool in accordance with claim 1 wherein said intermediate adherent refractory coating layer is selected from the group consisting of titanium carbide, vanadium carbide, chromium carbide, zirconium carbide, niobium carbide, molybdenum carbide, hafnium carbide, tantalum carbide, and tungsten carbide.

3. A coated composite ceramic cutting tool in accordance with claim 1 wherein said intermediate adherent refractory coating layer is selected from the group consisting of titanium nitride, vanadium nitride, chromium nitride, zirconium nitride, niobium nitride, molybdenum nitride, hafnium nitride, tantalum nitride, and tungsten nitride.

4. A coated composite ceramic cutting tool in accordance with claim 1 wherein said intermediate adherent refractory coating layer is selected from the group consisting of titanium carbonitride, vanadium carbonitride, chromium carbonitride, zirconium carbonitride, niobium carbonitride, molybdenum carbonitride, hafnium carbonitride, tantalum carbonitride, and tungsten carbonitride.

5. A coated composite ceramic cutting tool comprising a densified composite silicon nitride substrate having at least one intermediate adherent refractory coating layer and an outer adherent refractory coating layer, wherein said intermediate adherent refractory coating layer has a different chemical composition than said outer adherent refractory coating layer;

said substrate body consisting essentially of particles of a hard refractory material uniformly distributed in a matrix consisting essentially of a first phase of silicon nitride and a refractory second phase comprising silicon nitride and an effective amount of a densification aid selected from the group consisting of yttrium oxide, hafnium oxide, the lanthanide rare earth oxides, and mixtures thereof; and said intermediate adherent refractory coating layer and said outer adherent refractory coating layer being selected from the group consisting of carbides, nitrides and carbonitrides of Ti, V, Cr, Zr, Nb, Mo, Hf, Ta, W and combinations thereof and alumina.

6. A coated composite ceramic cutting tool in accordance with claim 1 wherein said intermediate adherent coating layer is of a thickness between about 0.1 microns and about 10 microns.

7. A coated composite ceramic cutting tool in accordance with claim 5 wherein said intermediate adherent coating layer is of a thickness between about 0.1 microns and about 10 microns.

8. A coated composite ceramic cutting tool in accordance with claim 1 wherein said outer adherent coating layer is of a thickness between about 1.0 and about 10 microns.

9. A coated composite ceramic cutting tool in accordance with claim 5 wherein said outer adherent coating layer is of a thickness between about 1.0 and about 10 microns.

* * * * *